Jan. 4, 1972  GIOVANNI CRESPI  3,632,698
DENSE MAGNESITE FURNACE HEARTHS HAVING A SUPERFICIAL
DOLOMITE-CONTAINING LAYER AND METHOD
Filed Nov. 25, 1969
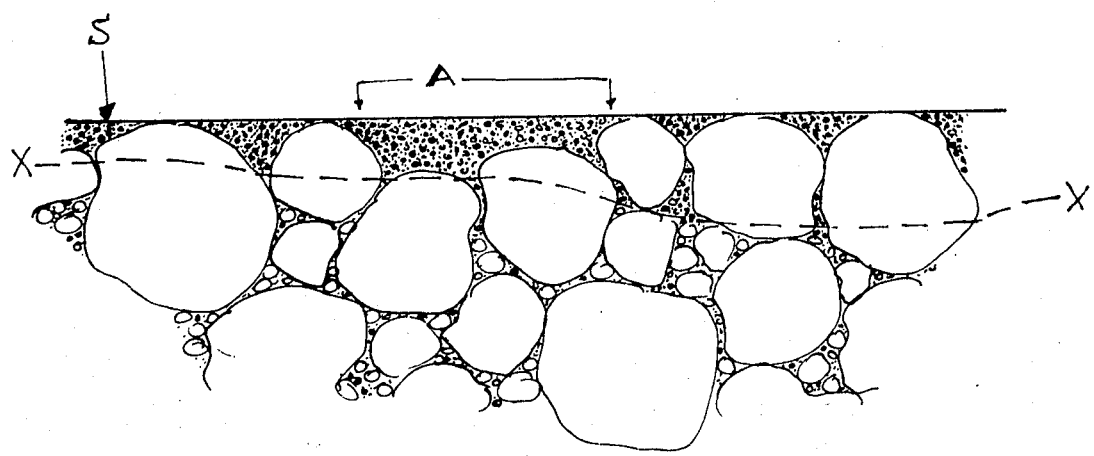
Giovanni Crespi
Inventor
By
Stevens, Davis, Miller & Mosher  Attorney United States Patent Office 3,632,698
Patented Jan. 4, 1972

3,632,698
DENSE MAGNESITE FURNACE HEARTHS HAVING A SUPERFICIAL DOLOMITE-CONTAINING LAYER AND METHOD
Giovanni Crespi, Via Tranquillo Cremona 29, Milan, Italy
Continuation-in-part of application Ser. No. 584,994, Oct. 7, 1966. This application Nov. 25, 1969, Ser. No. 879,740
Int. Cl. C04b 35/04, 35/06; C21c 5/44
U.S. Cl. 264—30
8 Claims

ABSTRACT OF THE DISCLOSURE

A process for the preparation of refractory masses, particularly for use in linings and hearths of metallurgical furnaces in which large monolithic pieces of magnesite material are consolidated with pulverent material. The pulverent material at the surface of the mass and extending for a short distance therebelow is so chosen as to induce the formation of a ceramized surface layer when the furnace is brought to operating temperature and contains at least 50% dolomite.

---

This application is a continuation-in-part of my copending application No. 584,994, filed Oct. 7, 1966.

The present invention relates to improvements in monolithic refractory bodies and also to a process for the manufacturing or emplacement thereof.

The oldest known technique for the preparation of refractory linings for metallurgical furnaces, and particularly for refractory bottoms consists of producing a mass of material in the form of powder and grains; this material being of dolomite or magnesite, and binding the mass together by means of tar, and/or chemical binding agents. Ordinarily, the size of the grains does not exceed 15–25 mm. in diameter. The refractory masses obtained from such mixtures only moderately resist the intense thermal conditions to which they are subject during the processing of molten metal.

Due to the deficiencies of such linings, dry refractory mixtures having no binders became increasingly popular. In producing such "dry" linings, an incoherent mass of dolomite, primarily in the form of powder or grains, is gradually compressed using hand tools until a compactness and consistency sufficient to bear the weight of molten metal is obtained. For the most part, the size of the grains used in producing such linings ranges from 10–15 mm. Although these linings prove to be considerably more resistant to thermal stresses than the previous ones, mechanical stresses in the lining, particularly during metal casting cause cracks and removal of portions of the refractory, consequently, calling for frequent fettling. In addition, the process for producing such linings is lengthy and complex due to the necessary for compressing the powder and grains exclusively by hand.

In practice, attempts to use magnesite for the dry linings described above were unsuccessful, and, consequently, attention was directed exclusively to dolomite, which has as a property, a high "alloying" capacity, and produces homogeneous refractory masses which are compact and quite resistant to wear even without the addition of special chemical binders. Even at the present time, various types of dry dolomite mixtures are known and use, but magnesite mixtures generally include alloying chemicals, such as aluminium and magnesium salts.

In recent times, a variation of the "dry" dolomite lining described above has been used. In this variation, pieces of dolomite of up to 120–130 mm. in diameter may be incorporated in the lining.

This type of lining provides a great advantage over refractory linings consisting of powder and grains smaller than, e.g., 30 mm. In linings formed from these smaller granules, a superficial ceramized layer is formed, being very hard and highly resistant to abrasion. Although, under the weight of fused metal, this superficial layer or ceramized crust remains perfectly set on the underlying material, it is nonetheless subject during furnace cooling periods (for example, at weekend pauses) to shrinkage which causes it to shift on the underlying material and thus be subjected to cracking (cracks 20–30 mm. wide, 2 to 3 mm. long, and 100–140 mm. deep have been noted). When the furance is again heated, the expansion of the refractory material tends to heal such cracks, but imperfectly. Due to subsequent abrasion produced by fused metal during smelting, the cracks act as sites which then facilitate the removal of crust portions from the underlying material with consequent need for repairs. In a lining incorporating large refractory pieces of from 120–130 mm. in diameter, the large pieces of refractory extend not only into the surface layer but also into the underlying portion. This creates an excellent binding effect between the crust and the underlying material. Even though such binding cannot prevent crust shrinkage during furnace cooling, it does, however, prevent the crust from sliding on the underlying material and, consequently, crust shrinkage does not concentrate on a few cracking positions with the formation of large cracks, but is evenly distributed throughout the whole surface by forming a net of hairline cracks which, when the next heating takes place, heal up in a perfect manner. Moreover, this binding also constitutes an excellent means of anchoring the crust, which is no longer subject to the abrasive action of the metal during pouring but is locked firmly in position.

The above-described crust—once it is formed—actually constitutes the element providing the desired characteristics of mechanical resistance and resistance to the abrasive action produced by the cast material. With the use of dolomite, it has been found that even when starting with a cold furnace having a newly produced refractory hearth, the ceramization process of the superficial or uppermost layer is sufficiently advanced as soon as the furnace is brought to running temperature. Moreover, at the end of the first melting, when the first castings therefrom are being poured, it can be said that the ceramized crust is substantially formed. Thus, with the use of dolomite in such process, it is possible to obtain refractory bottoms which are highly resistant to thermal and mechanical stresses and have an exceptionally long life, while at the same time are easy to install and use.

It is an object of the present invention to provide a "dry mixture" of the type in which large pieces of refractory are used; this mixture being formed primarily from magnesite.

It is another object of the present invention to provide a "dry mixture" of the type in which large pieces of refractory are used; this mixture being formed primarily from magnesite.

It is another object of the present invention to provide a process for making the above magnesite mixture.

It is a further object of the present invention to produce a refractory mass of high resistance to thermal and mechanical stresses which is capable of being used either for complete linings, in single blocks, for smelting furnaces, or for prefabricated elements of any dimensions.

The above objects are accomplished in the present invention despite a number of properties of magnesite which set it apart from refractory materials previously used in such processes.

When it was first attempted to produce a refractory lining making use of large magnesite pieces rather than large dolomite pieces, the different problems to be faced in treating magnesite at once became apparent. In fact, at the operating temperature of the furnace, a ceramized crust did not seem to form itself with the magnesite material, due to its high softening point, and a certain lesser "alloying" capacity.

Regardless of such difficulty, however, it was deemed necessary to pursue the treatment of magnesite since such material actually offers better refractory characteristics than dolomite (its use becomes practically indispensable in most modern furnaces for the production of special steels at very high temperatures, e.g., 1800° C.). Moreover, in certain geographical areas of the world, magnesite is in large supply while dolomite is not, and, consequently, one is able to purchase magnesite at prices which are competitive with those for dolomite.

Although it was observed that in certain cases it may be possible to obtain some ceramization of the upper crust in the magnesite lining by maintaining the same at a high enough temperature for a sufficient length of time, such procedure would be prohibitively expensive, due to the fact that a furnace would have to be maintained at a high temperature utilizing great amounts of power without starting the processing of metal. On the other hand, the objects of the present invention are achieved through means which enable quick and inexpensive production of a lining composed primarily of large magnesite pieces of from 35 to 150 mm. in diameter.

The refractory lining, formed according to the present invention, consists, in its lower layers, of large magnesite pieces of from 35 to 150 mm. in diameter and comminuted magnesite of 0.01 to 25 mm. in diameter filling the interstices therebetween. However, at the surface of the refractory lining and extending downwardly for about 40–80 mm., the interstices between the large magnesite blocks are filled with comminuted refractory material which has a cementing or consolidating effect. Such material can be chromite, alumina, bauxite, basic slag, dolomite, bauxite cement (obtained by firing bauxite), silicon-magnesium minerals, serpentine, olivine, talcum minerals, asbestos minerals, or any other like refractory material which is basic or almost basic and has a similar chemical composition. The granules may range between 0.01 and 10 mm. in diameter, but preferably no granules having a diameter greater than 4 mm. are used.

It has been found that with this arrangement of materials, a prompt ceramization of the uppermost layer is obtained as soon as the furnace is brought to running temperature. The crust so formed fulfills the required characteristics of mechanical resistance to high temperature without limiting the refractory characteristics of the large magnesite pieces at the surface and extending therebelow, or the refractory characteristics of the completely magnesite mass, which will gradually be exposed as the initial crust slowly wears. Due to the slowness of wear, the underlying magnesite undergoes ceramization for a sufficient length of time due to the action of the heat, and upon being totally exposed presents an effective refractory ceramized surface composed of magnesite alone.

The magnesite preferably used in the present invention contains from 93–96% MgO and is obtained by calcination at very high temperatures of from 1900–2200° C. The mixture thusly obtained is substantially composed of 55–70% of material in pieces from 35–150 mm. in diameter, and from 30–45% of material in a powdery or granular form ranging up to 25 mm. in diameter. Such pulverent material is limited to the quantity necessary for filling the interstices between the large pieces.

A preferred mixture which has a high specific gravity, but is given solely by way of example, comprises the following proportions of magnesite material:

(a) pieces of dimensions from 130 to 150 mm. from 15 to 20%
(b) pieces of dimensions from 80 to 130 mm. from 15 to 20%
(c) pieces of dimensions from 40 to 70 mm. from 40 to 25%
(d) grains of dimensions from 10 to 25 mm. from 10 to 15%
(e) powder of dimensions from 0.01 to 1 mm. from 20 to 25%

For best results using the above mixture, particularly when making a complete floor for a smelting furnace, the large pieces of magnesite are arranged in a layer, and a layer of powdered or granular magnesite is formed thereupon. The fine material is then distributed among the coarse under the influence of, for example, metallic vibrating needles partially immersed therein. The refractory thus mixed is then compressed using vibrating plates or rollers.

Preferably, pieces of magnesite of from 40–150 mm. in diameter are layed in a layer having a thickness of about 200 mm. A layer of powder or granules of 0.01–25 mm. in diameter is then spread thereupon; the granular layer being about 100–150 mm. deep. After mixing with vibrating needles and tamping, the thickness of the resulting layer is not in general any greater than the thickness of the single layer of large pieces of material. On this first layer or base, may be layed a second layer, and even two successive layers, the same steps of consolidation being repeated in each case until the final thickness of the refractory dictated by the use desired is obtained. The resulting refractory mass is thus stabilized with respect to volume, insulation, and life requirements.

Of course, in forming the uppermost layer, pieces of refractory comminuted material which are basic or neutral and have a cementing or consolidating action are used to fill the interstices between the large magnesite blocks. Such comminuted refractory material may range from 0.01 to 10 mm. preferably from 0.01 to 4 mm. in diameter, and may be selected from chromite, alumina, bauxite, bauxite cement, basic slag, dolomite, silicon magnesium minerals, serpentine, olivine, talcum minerals, ashestos minerals, or any other basic or almost basic material having a similar chemical composition. The resulting distribution of material in the instant refractory lining is shown in FIG. 1. Below the line X—X and between the large pieces of magnesite which range in diameter from 35 to 150 mm. comminuted magnesite of from 0.01 to 25 mm. in diameter is interposed. In the upper part of the lining, above the line X—X and extending for a distance of from 40–80 mm. is a layer comprised of large magnesite pieces of from 35 to 150 mm. in diameter and comminuted materials such as dolomite of from 0.01 to 10, preferably to 4 mm. in diameter interposed therebetween. Note that at the surface S of the lining which is exposed to the melted metal, a fully homogeneous layer of dolomite is not formed and, as a matter of fact, many large pieces of magnesite penetrate to the surface. Of course, it must be realized that in order to present a smooth surface during production comminuted dolomite or other like material may form a homogeneous layer in certain areas thereof, such as, for example, in the portion of FIG. 1 designated as A. Nevertheless, this takes place only as a result of the need for leveling the surface S.

In using a lining as shown in FIG. 1 and described above, ceramization will initially occur throughout the area lying above the line XX; however, due to the fact that many of the magnesite pieces which extend to the surface of the ceramized layer also extend into the layer therebelow, the ceramized layer will be firmly anchored and will not tend to shift as in the case of linings incorporating much smaller pieces. Furthermore, as the initial upper layer is slowly worn away, the underlying completely magnesite layers progressively ceramize under the effect of heat, thus providing for a highly durable and serviceable refractory surface.

In accordance with a modification of the process of the present invention, which may be employed particularly for making linings of lesser thicknesses, it is also possible to spread layers of 70–100 mm. one above the other, composed alternately of material in the form of pieces and material in the form of granules until the specified thickness is obtained, for example, 300 mm. The mass is then acted upon with vibrating needles to obtain effective mixing, and consolidation is subsequently effected. With a vibrating roller and a vibrating plate, each of a weight of about 3 to 4 hundred kilograms, a perfectly consolidated mass having an area of about 50 square meters may be obtained in 1.5–2 hours. Again, in this embodiment of the invention, the uppermost layer of comminuted refractory material is composed of a refractory having a cementing effect and being basic or neutral, such as chromite, alumina, bauxite, bauxite cement, basic slag, dolomite, or other refractories of like chemical characteristics. A particularly effective cementing or consolidating mixture consists of 50–80% dolomite mixed with 20–50% of a component selected from chromite, alumina, bauxite, bauxite cement, basic steel slag, asbestos minerals, or other refractories of like chemical characteristics.

By the process of the present invention, an increase of 15–20% in the density of the refractory lining is obtained. As is known, the refractory material used, namely, dead burned magnesite, has a density of 3.6 g./cc. According to known techniques, by using material in the form of powder and/or grains with sizes not exceeding 25 mm. a refractory lining is obtained having a density of 2.8 to 3.2 g./cc. By the process according to the present invention, it is possible to obtain a density of 3.5 to 3.6 g./cc. This high density, as is realized in the art, is particularly advantageous with respect to increasing the durability of the lining.

In furnaces of high capacity, for which the total thickness of the refractory mass may be of the order of 500–600 mm. the preparation of a complete floor of magnesite may be very costly. Therefore, it may be economical to utilize dolomite, if cheaper, in the lowermost portion of the floor. Without effectively reducing the resistance to the demands made in the capacity of the lining for insulation, the lower layers of the refractory mass may be made from dolomite which may even attain 40–50% of the total thickness of the floor. Above this base layer are then formed one or two layers of magnesite according to the present invention, thereby attaining a lining which as stated has substantially the same characteristics as a lining made wholly from magnesite. For the preparation of the base layer of dolomite, there is preferably used a mixture containing about 60% of dolomite gravel having pieces of 50–100 mm. therein, the rest being dolomite powder and grains with a size not exceeding 25 mm.

Even if the basic magnesia material used in the preparation of the refractory masses according to the present invention is preferably obtained by calcination at temperatures of 1900–2000° C. in proper kilns, it is however possible to use magnesite deriving from tailings of refractory bricks coming from the demolition of furnace linings.

The refractory masses obtained according to the present invention are particularly suitable for the preparation of floors, and linings in general, for Martin Siemens furnaces, arc furnaces, and converters of the L. D. Kaldo and similar types, but they may be most usefully applied to the preparation of prefabricated elements, such as large blocks and the like, either for the floor itself or for the lining of the sides and roofs of furnaces.

Having thus described my invention, I claim:

1. A process for the preparation of refractory linings particularly for use in walls and bottoms of metallurgical furnaces, comprising: mixing large pieces of magnesite of from 35 to 150 mm. in diameter with comminuted refractory material of 0.01 to 25 mm. in diameter, said comminuted material being limited to the amount necessary to fill the interstices between said large pieces of magnesite, the comminuted refractory material extending from the bottom of the lining to within 40–80 mm. of the surface consisting essentially of magnesite, and the comminuted refractory material in the 40–80 mm. thick superficial surface layer consisting essentially of particles of 0.01 to 10 mm. in diameter and comprising at least 50% dolomite mixed with another cementing and consolidating component in such a manner that the dolomite and said component total 100% of the amount necessary to fill the interstices in said superficial layer, said component selected from the group consisting essentially of chromite, alumina, bauxite, dolomite, bauxite cement, basic steel slag, asbestos minerals, silicon-magnesium minerals and mixtures thereof.

2. The process of claim 1 wherein said silicon-magnesium minerals are selected from the group consisting essentially of serpentine, olivine and talc.

3. The process of claim 1 in which said comminuted refractory material forming the superficial layer consists essentially of dolomite.

4. The process of claim 1, comprising mixing 55 to 70 parts of large pieces of magnesite with 30 to 45 parts of comminuted refractory material.

5. A refractory mass for use in lining the walls and bottoms of metallurgical furnaces, comprising large magnesite pieces of from 35 to 150 mm. in diameter, the depth to which said pieces extend being determined by the required refractory characteristics of the linings in respect to the operating temperature, the lowermost interstices between said large magnesite pieces being filled by comminuted magnesite material of 0.01 to 25 mm. in diameter, and the uppermost interstices between said large magnesite pieces for a depth of 40–80 mm. from the upper surface being filled by comminuted refractory material of 0.01 to 10 mm.; preferably to 4 mm. in diameter, said refractory material being of a basic to neutral nature comprising at least 50% dolomite mixed with another cementing and consolidating component in such a manner that the dolomite and said component total 100% of said comminuted refractory material, said component selected from the group consisting essentially of chromite, alumina, dolomite, bauxite, bauxite cement, basic steel slag, asbestos minerals, silicon-magnesium minerals and mixtures thereof.

6. The refractory mass of claim 4 in which said uppermost interstices are essentially filled with dolomite.

7. The refractory mass of claim 4 wherein said silicon-magnesium minerals are selected from the group consisting essentially of serpentine, olivine, and talc.

8. The refractory mass of claim 4 in which said large pieces of magnesite comprise 55–70 parts of said mass and said comminuted refractory material and comminuted magnesite comprise 30–45 parts thereof.

References Cited

UNITED STATES PATENTS

| 1,704,902 | 3/1929 | Rohn | 264—30 |
| 1,917,849 | 7/1933 | Northrup | 264—30 |
| 1,944,709 | 1/1934 | Friedersdorff | 264—30 |
| 2,504,185 | 4/1950 | Debenham | 264—30 |
| 3,204,937 | 9/1965 | Crespi | 264—30 |

OTHER REFERENCES

J. H. Chesters, Steelplant Refractories, 1957, The United Steel Companies Ltd., Sheffield, England, pages 386–392 and 395–401.

JULIUS FROME, Primary Examiner

J. H. MILLER, Assistant Examiner

U.S. Cl. X.R.

106—58, 61; 266—40, 43